(12) United States Patent
Walash

(10) Patent No.: US 10,377,404 B1
(45) Date of Patent: Aug. 13, 2019

(54) STEERABLE PAIRED DOLLY SYSTEM

(71) Applicant: Neil Walash, New York, NY (US)

(72) Inventor: Neil Walash, New York, NY (US)

(73) Assignee: Von Rohr Equiptment Corp., East Orange, NJ (US)

( * ) Notice: Subject to any disclaimer, the term of this patent is extended or adjusted under 35 U.S.C. 154(b) by 0 days.

(21) Appl. No.: 16/111,906

(22) Filed: Aug. 24, 2018

(51) Int. Cl.
| | |
|---|---|
| *B62B 3/10* | (2006.01) |
| *B62B 5/06* | (2006.01) |
| *B62B 5/00* | (2006.01) |
| *B62D 13/02* | (2006.01) |
| *B62B 3/00* | (2006.01) |
| *B60P 3/40* | (2006.01) |

(52) U.S. Cl.
CPC .............. *B62B 5/0083* (2013.01); *B60P 3/40* (2013.01); *B62B 3/001* (2013.01); *B62B 3/10* (2013.01); *B62B 5/06* (2013.01); *B62D 13/02* (2013.01)

(58) Field of Classification Search
CPC ......... B62B 5/0083; B62B 5/06; B62B 3/001; B62B 3/10; B62B 3/102; B62B 3/104; B60P 3/40; B62D 13/02

USPC .............................................. 280/47.24, 79.6
See application file for complete search history.

(56) References Cited

U.S. PATENT DOCUMENTS

| | | | |
|---|---|---|---|
| 3,430,973 A | 3/1969 | Vartanian et al. | |
| 3,647,237 A * | 3/1972 | Milton | B62B 3/04 254/8 R |
| 3,918,733 A | 11/1975 | Macho et al. | |
| 4,465,291 A | 8/1984 | Wylie et al. | |
| 4,768,802 A | 9/1988 | Winkler | |
| 6,325,403 B1 | 12/2001 | Brutger | |
| 7,845,670 B2 * | 12/2010 | Oberg | B60D 1/66 280/47.24 |
| 9,669,855 B2 * | 6/2017 | Elliott | B62B 1/004 |

* cited by examiner

*Primary Examiner* — John D Walters
(74) *Attorney, Agent, or Firm* — Thomas J. Cerminario

(57) ABSTRACT

A set of two two-wheeled dollies, each of which has a cradle, preferably V-shaped, is configured to support a length of pipe or other elongated construction material. The dolly set consists of a steerable forward dolly, having a steering handle, and a non-steerable rear dolly. The two dollies are deployed in tandem, with the forward dolly supporting the front end of the load, and the rear dolly supporting the load's back end. By turning the handle bar of the forward dolly in a selected direction and applying a force in that direction, the tandem paired dolly set moves the elongated load in the selected direction.

4 Claims, 6 Drawing Sheets

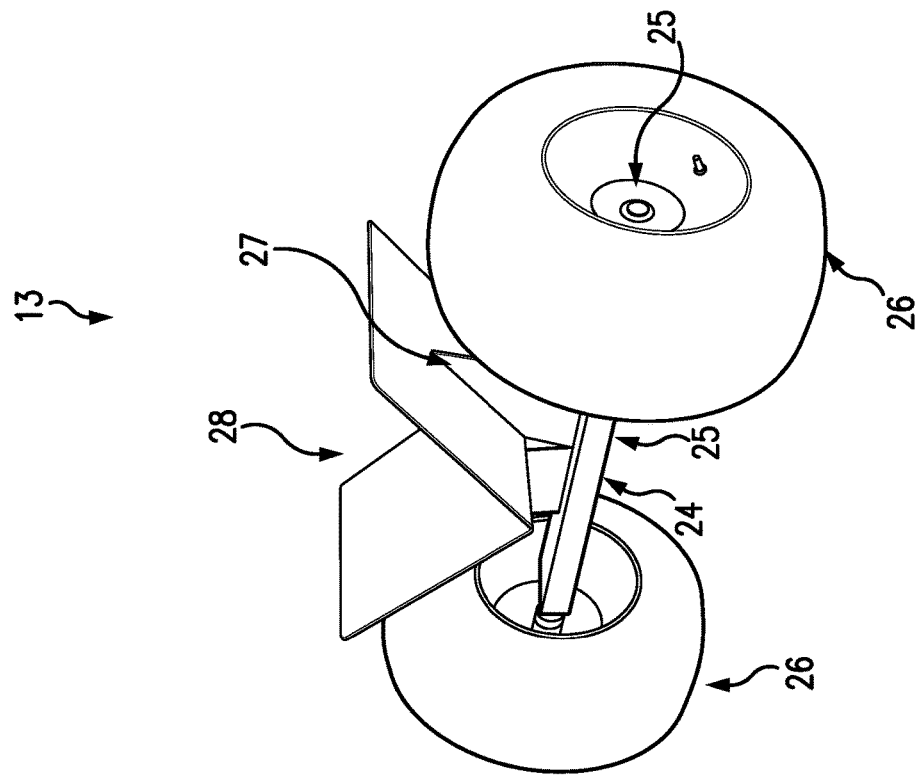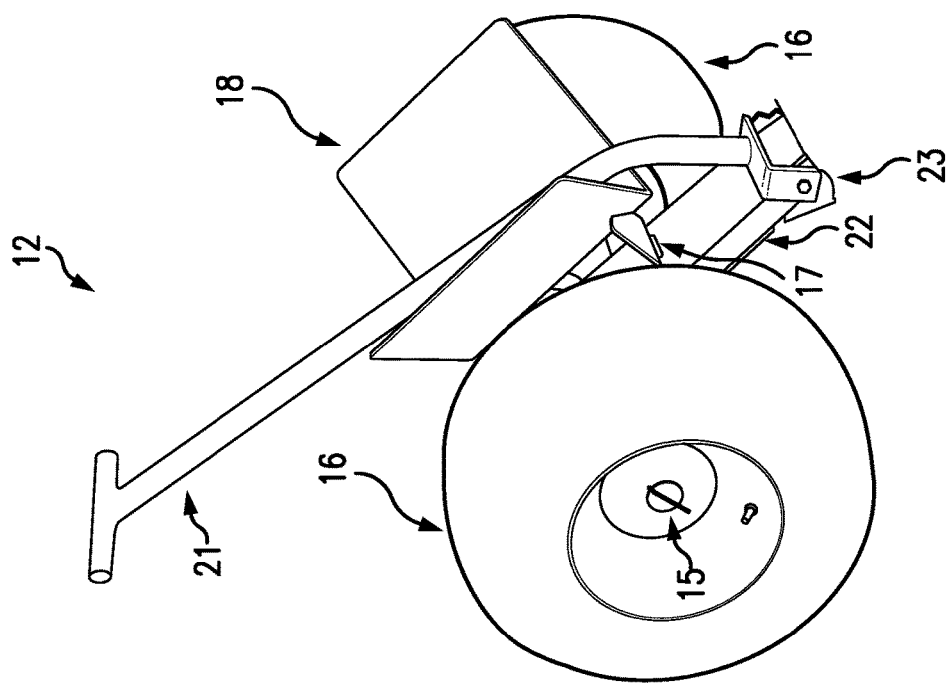

STEERABLE PAIRED DOLLY SYSTEM

FIELD OF INVENTION

The present invention relates to the general field of apparatus for moving materials, tools and/or equipment on construction sites, and to the particular field of dollies.

BACKGROUND OF THE INVENTION

Dollies of various types have long been used to move materials, tools and equipment on construction sites. Single dolly systems, however, are not well suited for moving heavy elongated loads, such as pipes and poles. Combining multiple dollies in tandem can also be problematic in terms of steering the load. The present invention provides a steerable pair of dollies specifically designed to move heavy, elongated loads on construction sites.

SUMMARY OF THE INVENTION

The present invention comprises a set of two two-wheeled dollies, each of which has a cradle, preferably V-shaped, that is configured to support a length of pipe or other elongated construction material. The dolly set consists of a steerable forward dolly, having a steering handle, and a non-steerable rear dolly. The two dollies are deployed in tandem, with the forward dolly supporting the front end of the load, and the rear dolly supporting the load's back end.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 2 is a perspective view of the forward dolly of the exemplary embodiment of the present invention shown in FIG. 1;

FIG. 3 is a perspective view of the rear dolly of the exemplary embodiment of the present invention shown in FIG. 1;

DETAILED DESCRIPTION OF THE PREFERRED EMBODIMENT

Figure 1:
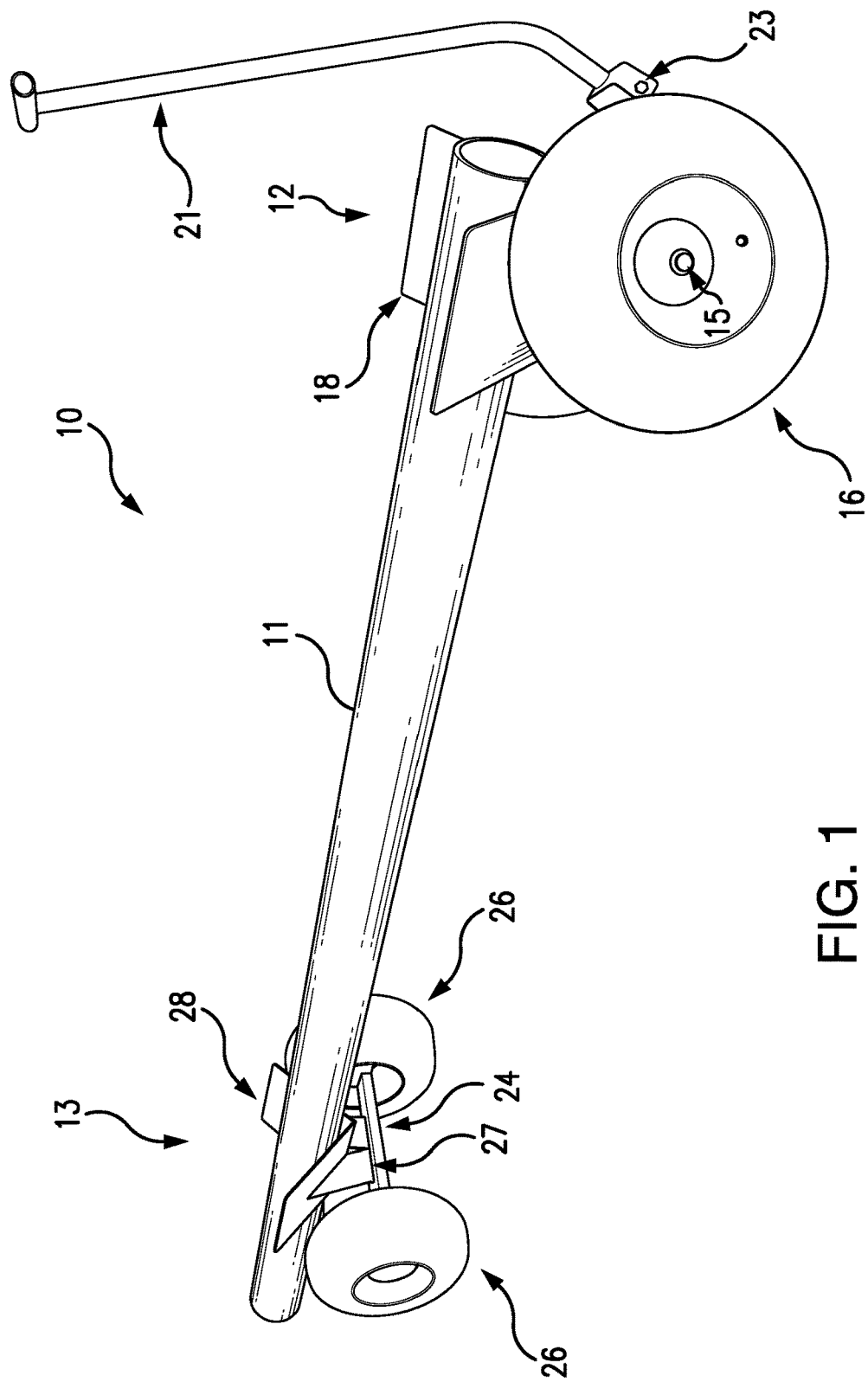
FIG. 1 is a perspective view of an exemplary embodiment of the present invention, comprising a steerable pair of two-wheeled dollies deployed in moving a length of pipe.
Figure 4:
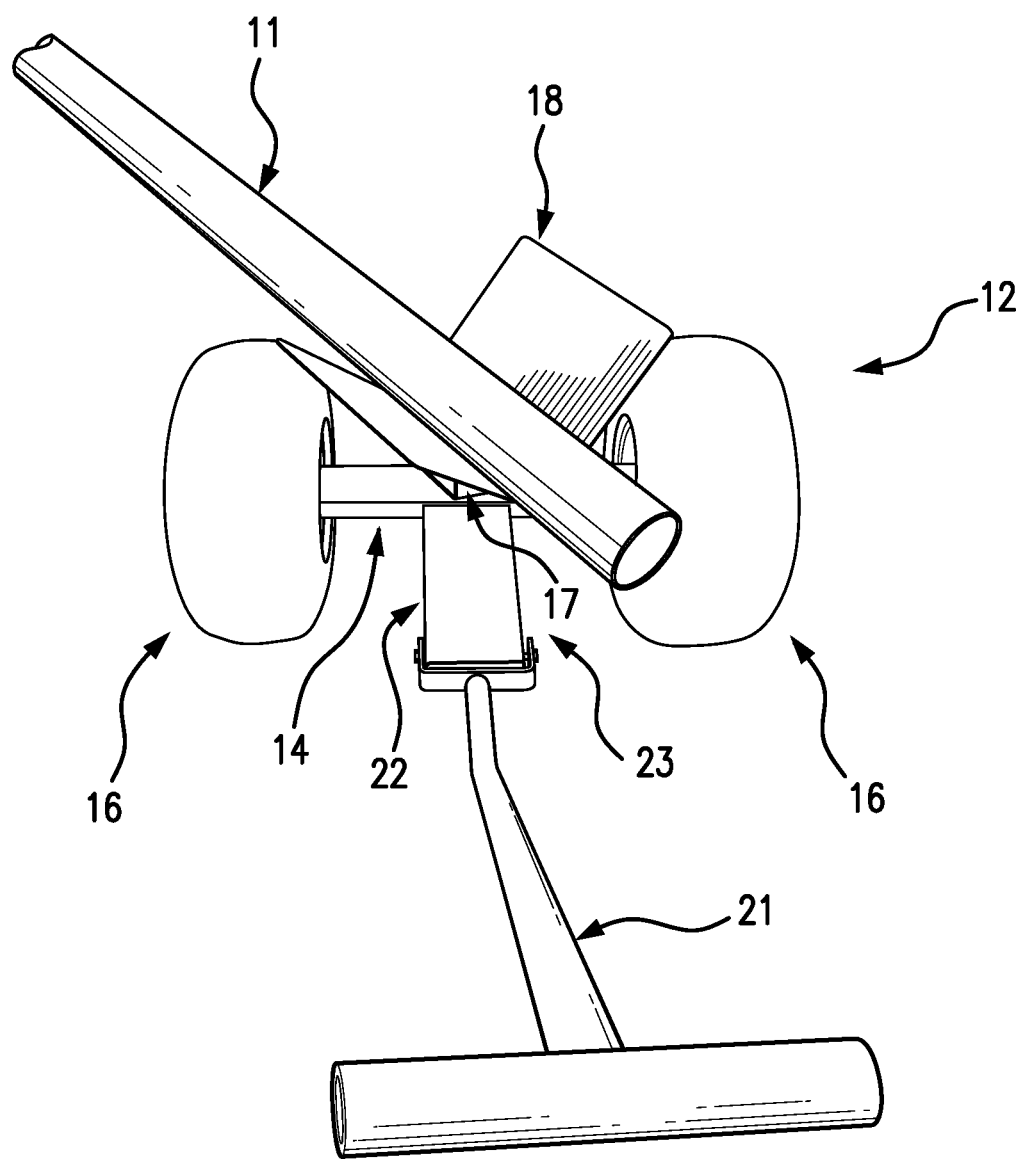
FIG. 4 is a perspective view of the forward dolly shown in FIG. 2, with the forward dolly frame turned relative to the forward cradle.

Referring to FIGS. 1-3, an exemplary steerable dolly set 10 is configured in tandem to move a heavy, elongated load 11, such as the depicted length of pipe. The dolly set 10 comprises a steerable forward dolly 12 and a non-steerable rear dolly 13. The front end of the load 11 is supported by the forward dolly 12, and the back end of the load 11 is supported by the rear dolly 13.

As best seen in FIGS. 4-7, the forward dolly comprises an elongated, generally rectangular, horizontally-extending forward dolly frame 14. A forward axle 15 is attached beneath the forward dolly frame 14, with the two protruding axle ends rotatably connected to two forward wheels 16. Preferably, the forward wheels 16, as depicted, have metal wheel rims and inflatable tires. A forward cradle support 17 is laterally pivotally attached to the upper side of the forward dolly frame 14, and a forward cradle 18 is attached to the forward cradle support 17 and is supported above it. The forward cradle 18 is preferably a V-shaped trough that aligns longitudinally with the elongated load 11.

Figure 6:
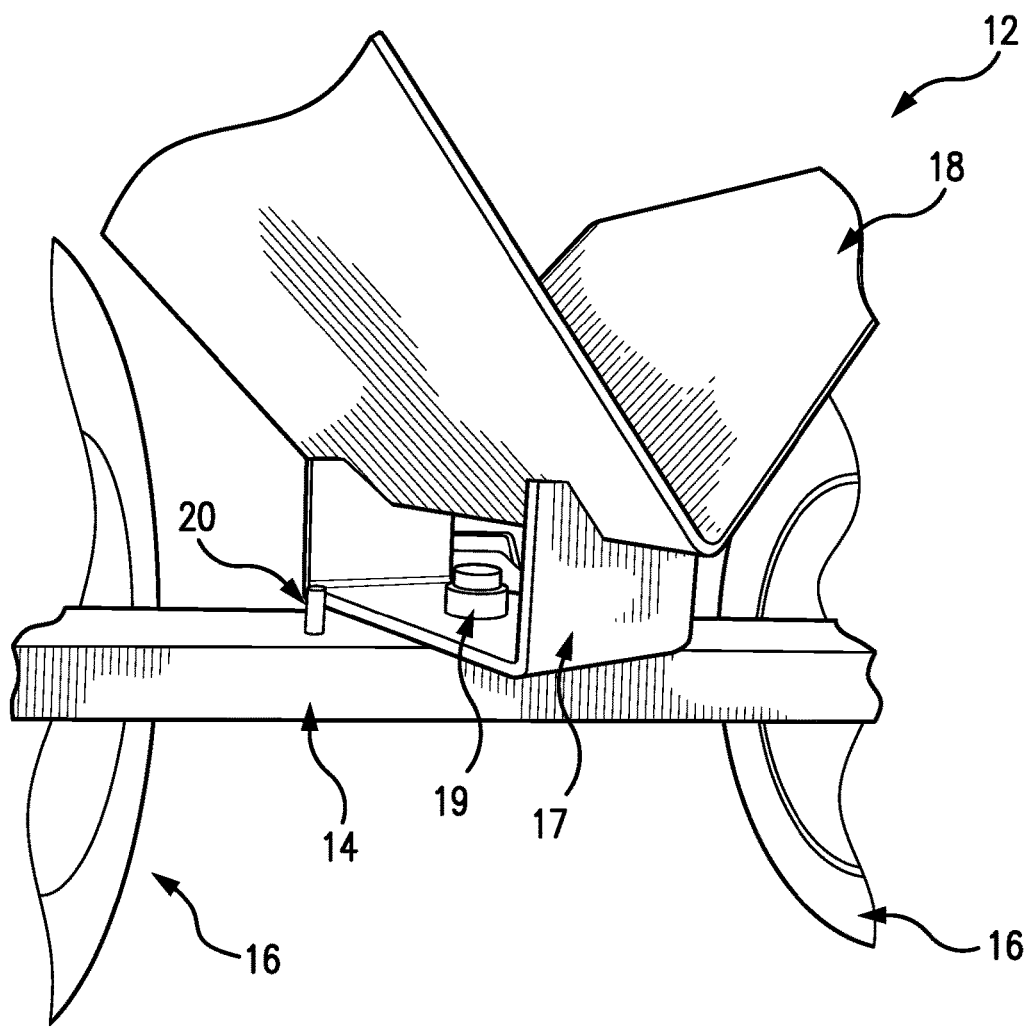
FIG. 6 is a detail rear perspective view of the forward dolly, showing the laterally pivoting connection between the forward dolly frame and the forward cradle support.

As best seen in FIG. 6, the pivoting connection between the forward dolly frame 14 and the forward cradle support 17 is a pivot shaft 19, which forms an axis about which the forward cradle support 17 can turn. Pivot stops 20 on either side of the forward cradle support 17 limit the range of its pivoting motion.

Figure 5:
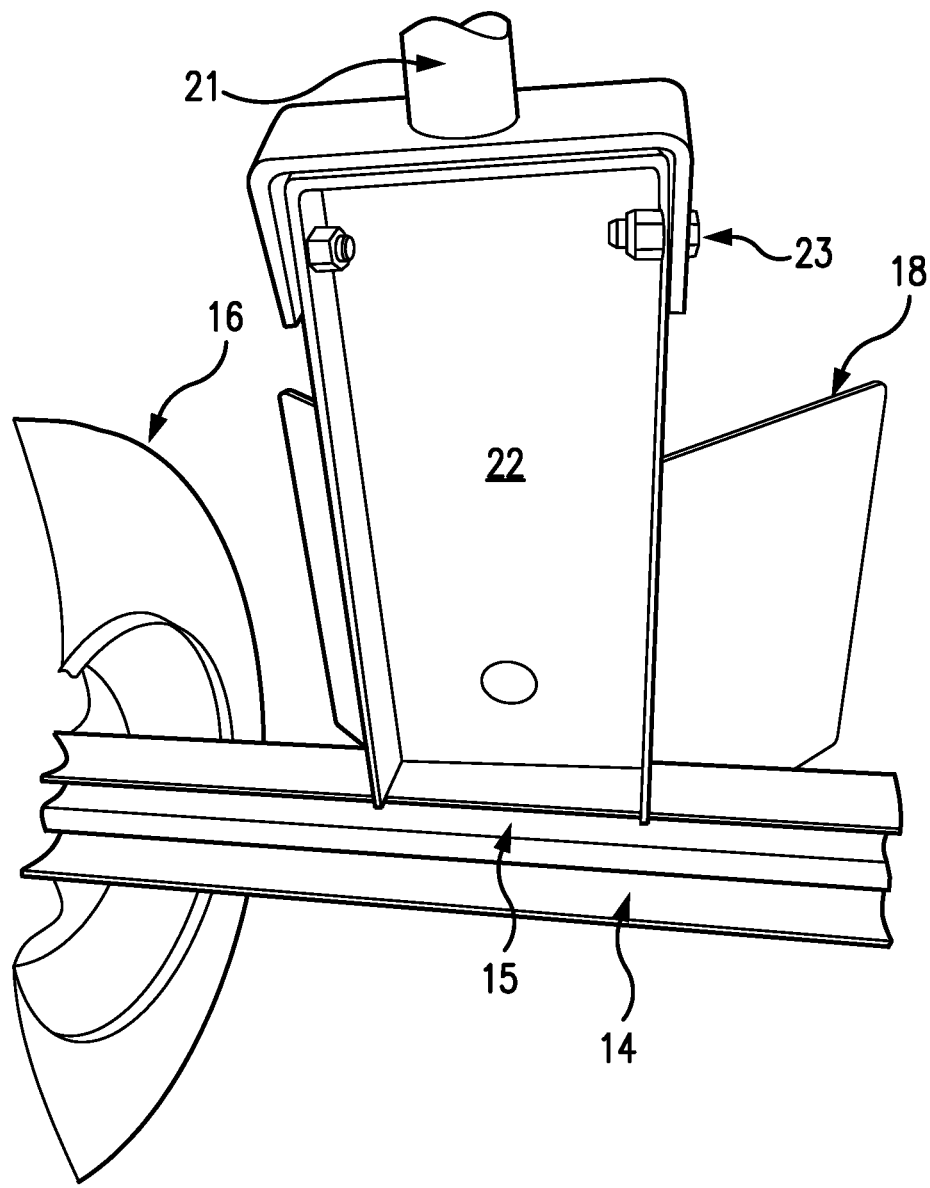
FIG. 5 is a detail perspective view of the underside of the forward dolly depicted in FIGS. 2 and 4.
Figure 7:
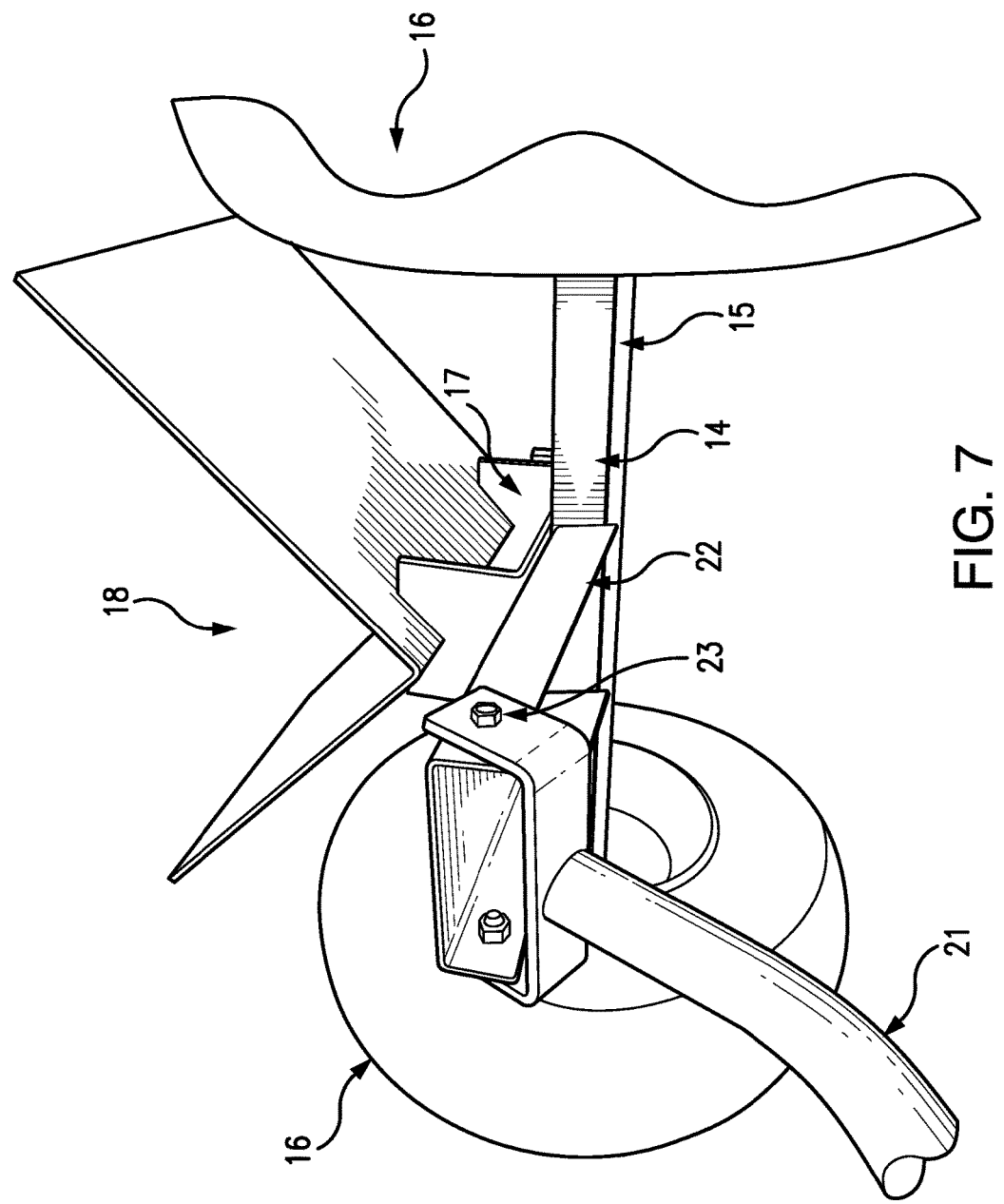
FIG. 7 is a detail front perspective view of the forward dolly, showing the vertically pivoting connection between the forward dolly frame and the handle door.

As best seen in FIGS. 5 and 7, an elongated handle bar 21 is connected to the front side of the forward dolly frame 14. Preferably, the handle bar 21 is vertically pivotally connected to the forward dolly frame 14 through a generally rectangular tow bar 22, to which the handle bar 21 is vertically pivotally attached by a handle pivot 23 that allows the handle bar 21 to be raised and lowered. The handle bar 21 is operable to pivot the forward dolly frame 14 relative to the forward cradle support 17, thereby steering the forward dolly 12 in a selected direction toward which the handle bar 21 is turned.

As best seen in FIG. 3, the rear dolly 13 comprises an elongated, generally rectangular, horizontally-extending rear dolly frame 24. A rear axle 25 is attached beneath the rear dolly frame 24, with the two protruding axle ends rotatably connected to two rear wheels 26. Preferably, the rear wheels 26, as depicted, have metal wheel rims and inflatable tires. A rear cradle support 27 is laterally pivotally attached to the upper side of the rear dolly frame 24, and a rear cradle 28 is attached to the rear cradle support 27 and is supported above it. The rear cradle 28 is preferably a V-shaped trough that aligns longitudinally with the elongated load 11.

By turning the handle bar 21 of the forward dolly 12 in a selected direction and applying a force in that direction, the tandem paired dolly set 10 moves the elongated load 11 in the selected direction.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A tandem paired dolly system for moving an elongated load, the system comprising:

a steerable forward dolly, comprising an elongated, generally rectangular, horizontally-extending forward dolly frame having two lateral edges, a front side, a back side, an upper side, and a lower side, a forward axle affixed beneath the lower side of the forward dolly frame and having two forward axle ends protruding beyond the lateral edges of the forward dolly frame, two forward wheels rotatably connected to the two forward axle ends, a forward cradle support laterally pivotally attached by a pivot shaft to the upper side of the forward dolly frame, a forward cradle having a lower cradle surface which is attached to and supported above the forward cradle support, and an elongated handle bar connected to the front side of the forward dolly frame, wherein the forward cradle support comprises a flat, horizontal, generally rectangular base, having two long sides and two short sides, and having a central base aperture through which the pivot shaft passes, and two flat, vertical, generally rectangular side flanges which extend upwardly, integrally and orthogonally from the two short sides of the base, and wherein each of the side flanges has an upper edge containing a flange recess which conforms to a shape of the lower surface of the forward cradle and upon which the forward cradle is supported, and wherein the handle bar is operable to pivot the forward dolly frame relative to the forward cradle support, thereby steering the forward dolly in a selected direction toward which the handle bar is turned;

a rear dolly, comprising an elongated, generally rectangular, horizontally-extending rear dolly frame, having two lateral edges, an upper side and a lower side, a rear axle affixed beneath the lower side of the rear dolly frame and having two rear axle ends protruding beyond the lateral edges of the rear dolly frame, two rear wheels rotatably connected to the two rear axle ends, a rear cradle support attached to the upper side of the rear dolly frame, and a rear cradle attached to and supported above the rear cradle support;

wherein the elongated load has a front load end and a back load end, and wherein the forward dolly is positioned beneath the front load end with the forward cradle supporting the front load end, and wherein the rear dolly is positioned beneath the back load end with the rear cradle supporting the back load end; and wherein, by applying a force on the handle bar in the selected direction to which the handle bar is turned, the tandem paired dolly system moves the elongated load forward in the selected direction.

2. The tandem paired dolly system according to claim 1, wherein the forward cradle and the rear cradle both comprise a V-shaped trough that aligns longitudinally with the elongated load.

3. The tandem paired dolly system according to claim 2, wherein the handle bar is vertically pivotally connected to the front side of the forward dolly frame through a generally rectangular tow bar extending from the front side of the forward dolly frame, such that the handle bar can be vertically raised and lowered.

4. The tandem paired dolly system according to claim 3, wherein the forward wheels and the rear wheels both comprise metal wheel rims encompassed by inflatable tires.

* * * * *